United States Patent [19]

Henke

[11] 4,077,777

[45] Mar. 7, 1978

[54] NEUTRALIZATION OF GASES

[76] Inventor: Werner Henke, P.O. Box 51932, Oil Center Station, Lafayette, La. 70501

[21] Appl. No.: 677,061

[22] Filed: Apr. 15, 1976

Related U.S. Application Data

[63] Continuation of Ser. No. 496,652, Aug. 12, 1974, abandoned.

[51] Int. Cl.² .............. B01J 8/02; E21B 41/00
[52] U.S. Cl. .................. 23/288 R; 23/288 F; 23/288 FB; 175/66; 175/206; 423/230
[58] Field of Search .......... 23/288 R, 288 F, 288 FB, 23/277 C; 423/220, 230; 166/265–267; 175/66, 206; 55/46, 68, 190–193

[56] References Cited

U.S. PATENT DOCUMENTS

| Re. 26,220 | 6/1967 | Records | 166/267 X |
|---|---|---|---|
| 2,910,343 | 10/1959 | Childers et al. | 23/288 FB |
| 3,429,656 | 2/1969 | Taylor et al. | 23/288 FB |
| 3,464,801 | 9/1969 | Barstow | 23/281 X |
| 3,633,687 | 1/1972 | West et al. | 175/206 X |
| 3,845,196 | 10/1974 | Rhoades | 166/267 X |

*Primary Examiner*—Morris O. Wolk
*Assistant Examiner*—Roger F. Phillips
*Attorney, Agent, or Firm*—Arthur M. Dula; Murray Robinson; Ned L. Conley

[57] ABSTRACT

A method and system for neutralizing various toxic and explosive gases, described particularly with respect to those gases which escape during the drilling of oil and gas wells, including heating the gases to reacting temperature, desulfurizing the gases with a suitable catalyst, and reacting hydrocarbon gases to form inert gases. In one embodiment exhaust gases from existing energy sources are utilized to accomplish heating and these gases are also rendered inert. A means is also disclosed for disposing of large volumes of natural gas produced in "kicks" during the drilling of oil wells.

3 Claims, 6 Drawing Figures

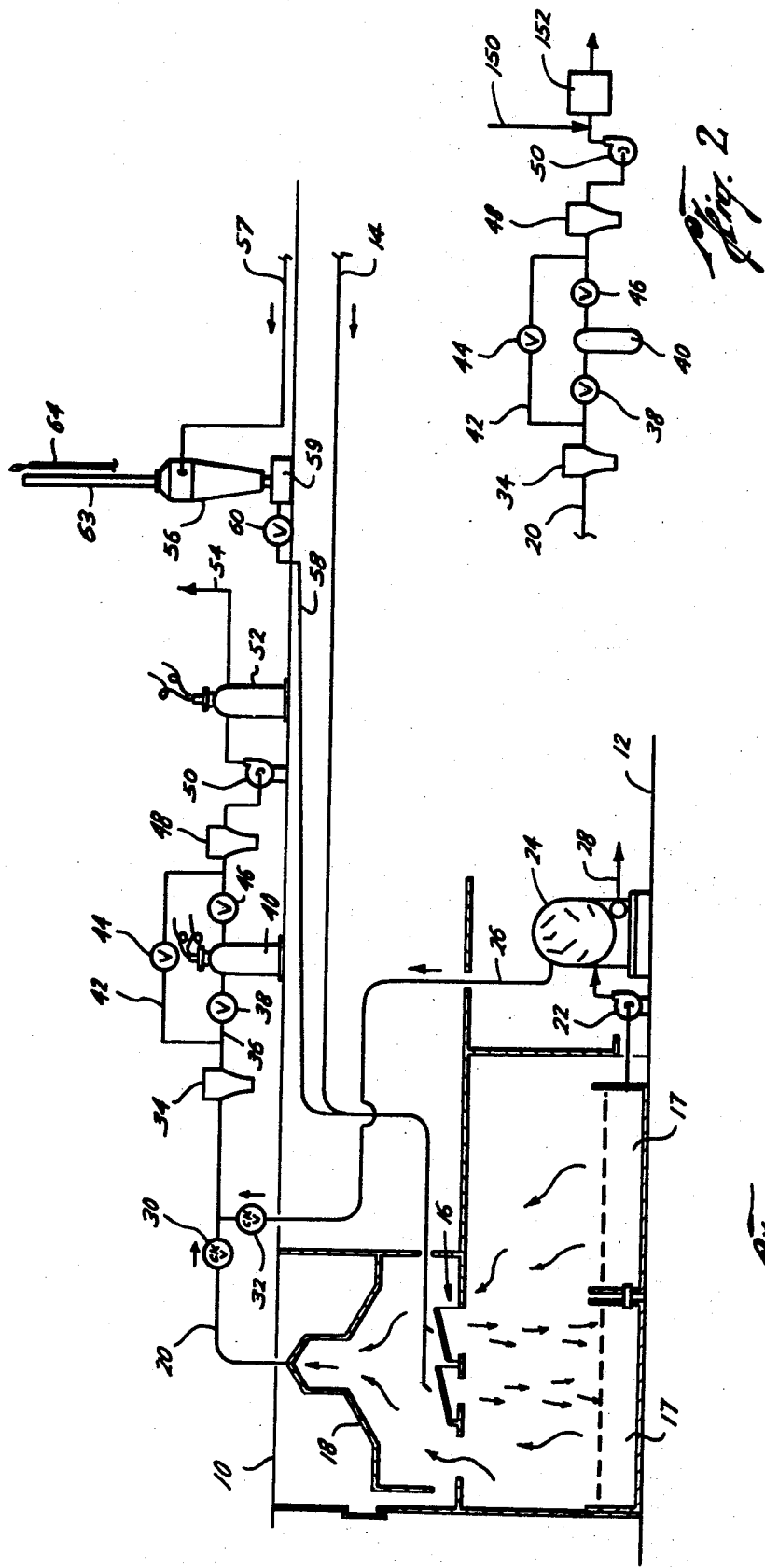
Fig. 1
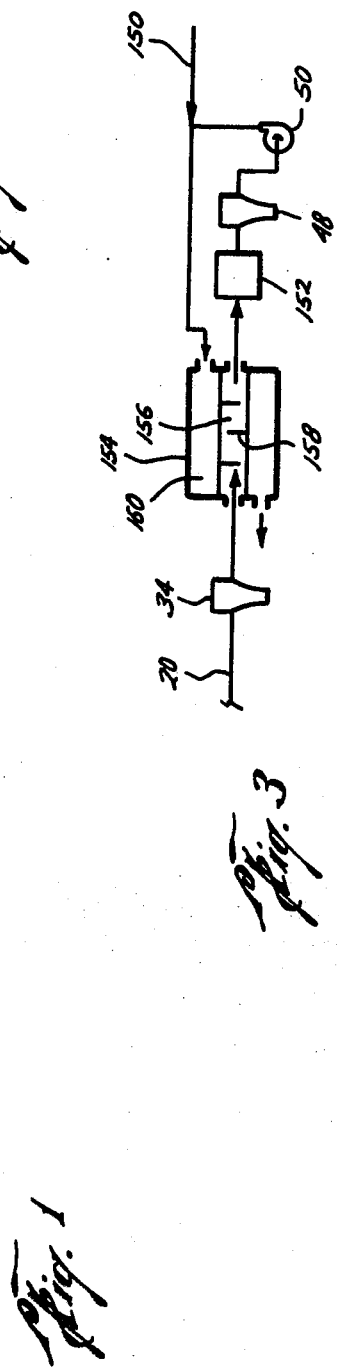
Fig. 2
Fig. 3

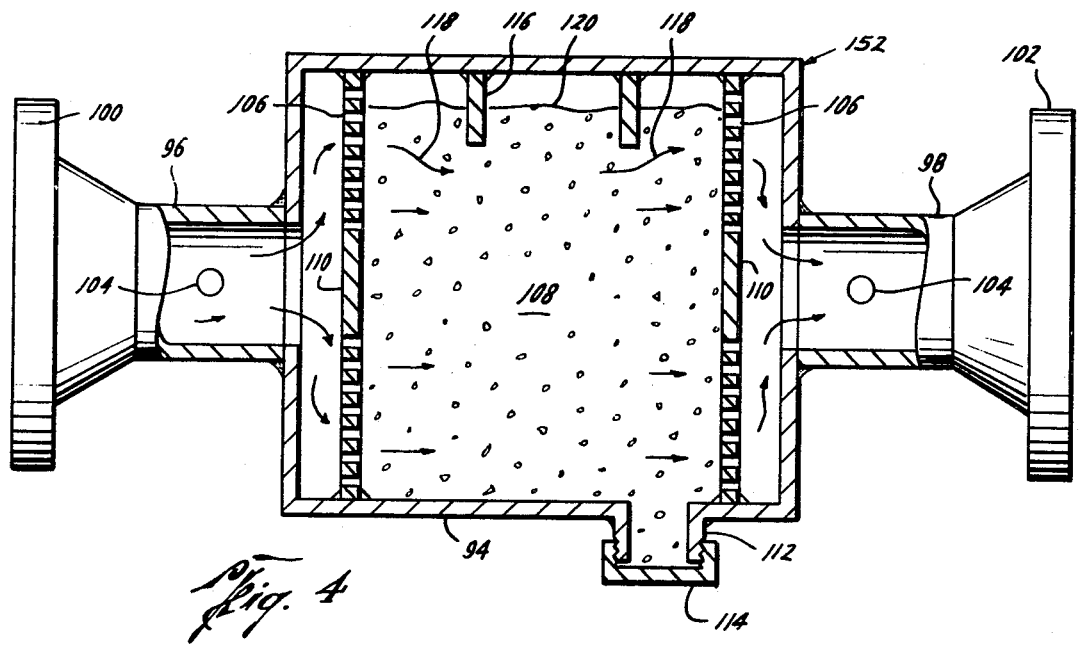
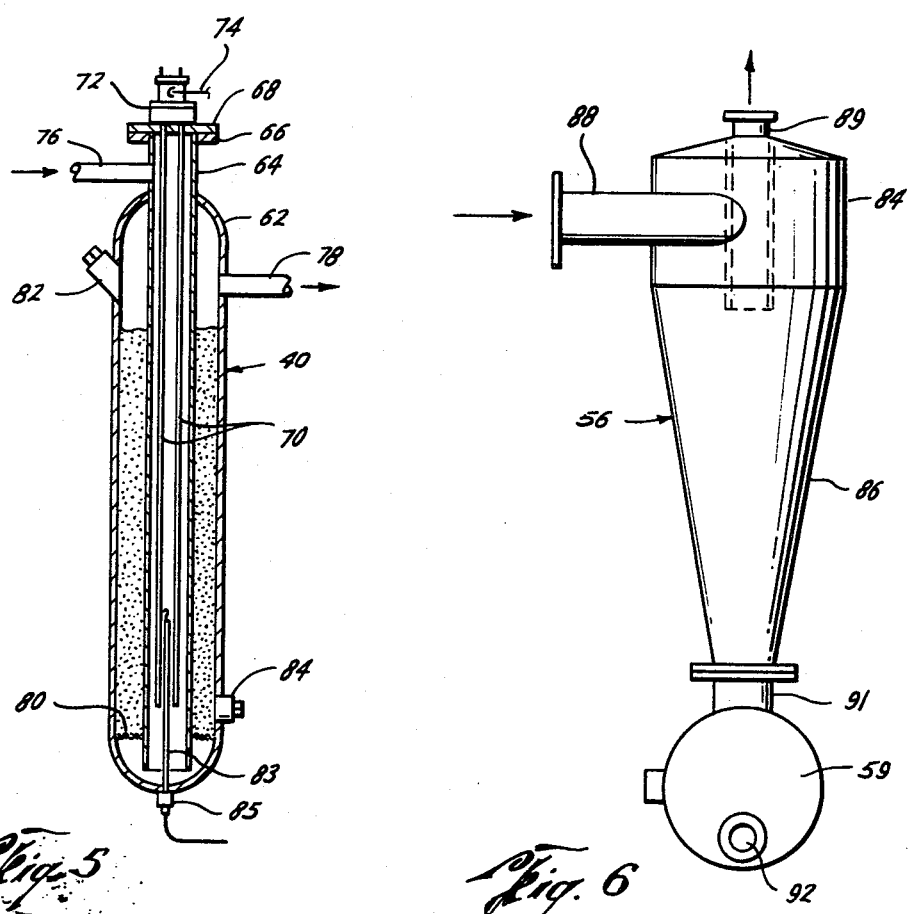

NEUTRALIZATION OF GASES

This is a continuation of application Ser. No. 496,652, filed Aug. 12, 1974, now abandoned,

BACKGROUND OF THE INVENTION

1. Field of the Invention

This invention relates to methods and systems for neutralizing toxic, explosive, and other potentially harmful gases, and more particularly it relates to such methods and systems for use in connection with oil and gas drilling and production.

2. Description of the Prior Art

There are many industrial facilities where toxic and explosive gases necessarily escape with consequent danger to personnel, pollution of the environment, and possible destructive explosion and fire. This is particularly a problem around oil and gas drilling rigs and oil and gas production facilities. Numerous fires and explosions have occurred on drilling rigs and production facilities with resulting injury and death to personnel and destruction of property. Although it is often difficult to fix the precise blame for such fires and explosions, it is apparent that in any such instance flammable vapors and gases must have been present. One situation which is particularly hazardous because of the presence of such flammable vapors and gases, as well as other toxic gases, is that of the offshore drilling platform, which has numerous enclosed and partially enclosed areas which can act as gathering places for explosive and toxic mixtures of gases. Such gases are necessarily produced during the drilling operation, and are carried to the surface in solution in the drilling fluid. When the drilling fluid reaches the surface, decreased pressures allow the escape of some gas. Other gases are purposely removed by degassing equipment so as to raise the specific gravity of the drilling fluid. Such gases usually consist primarily of methane, although other low-boiling hydrocarbons, such as ethane and propane, are usually also present, and sulfur-containing compounds, such as hydrogen sulfide, mercaptans and sulfur oxides, are also sometimes present.

In the past it has not been possible to gather and dispose of such gas in a manner which will insure protection from the possible harmful effects of the gas.

On the same offshore platforms (as well as in other industrial operations where toxic and explosive gases may escape) various hydrocarbon fuel energy generators are usually also present. Such energy generators, as, for example, gas engines and diesel engines, emit exhaust which contain, among other things, carbon monoxide, carbon dioxide, water vapor, unburned and partially oxidized hydrocarbons, nitrogen oxides, and other undesirable gases which will pollute the atmosphere. These gases also tend to accumulate in enclosed and partially enclosed areas. Methods have heretofore been devised to render these exhaust gases inert by reacting them in the presence of an oxidation catalyst to produce primarily nitrogen, carbon dioxide and water. Such methods are described, for example, in U.S. Pat. Nos. 3,000,707 to Barstow, 3,232,885 to the present inventor, and 3,579,308 to Gower.

To combat the accumulation of undesirable gases it has heretofore been the practice to utilize large fans to blow the gases away from areas such as an offshore platform. However, this method does not insure that all of the undesirable gases are removed from the platform, and wind, humidity and other atmospheric conditions may cause the unwanted gas to merely be transported to various corners and crannies where it may collect in high toxic or flammable concentrations. It is impractical to collect and burn the gases because the flow is generally intermittent and the mixtures of air and gas that are collected could not be depended upon to have the proper air to fuel ratio to sustain combustion.

Hydrogen sulfide is a common ingredient gas which is produced with drilling fluid. This gas is extremely toxic, even small amounts being deadly, so that the dispersing of this gas in areas where personnel are working creates an extremely dangerous and hazardous condition.

In the drilling of oil wells, sometimes gas pockets are encountered by the drill and a large high pressure gas bubble is released so that it passes up the well with the drilling fluid. This gas bubble, called a "kick" in the field, produces an extremely large volume of gas in a short period of time, which gas must be disposed of in such a way as to avoid endangering personnel and equipment.

SUMMARY OF THE INVENTION

According to the present invention, toxic or explosive gases which might normally escape to the atmosphere and endanger personnel and equipment are collected and passed through a reactor which causes the gases to be reacted to convert them to a less dangerous state. Where the gases contain sulfur compounds the gas first contacts a catalyst which causes removal of the sulfur. Preferably the gas is then passed into contact with an oxidation catalyst which causes the conversion of hydrocarbon gases to carbon dioxide and water.

In one embodiment of the invention improved results are obtained by heating the gas so that it contacts the catalyst at high temperatures, thereby achieving more efficient conversion.

In another embodiment of the invention exhaust gases from energy converters are combined with the other gases and utilized to obtain the necessary high temperature, while at the same time the exhaust gases are treated by the catalyst to form a harmless product.

The invention provides a method and system for the substantial elimination of toxic and explosive gases around a drilling rig, either on shore or off shore, by combining the procedure just described with the method for collecting and burning abnormally large bubbles of gas which may be produced during drilling.

BRIEF DESCRIPTION OF THE DRAWING

For a detailed description of certain preferred embodiments of the invention reference will now be made to the accompanying drawings wherein:

FIG. 1 is a schematic drawing of one embodiment of a system according to this invention, shown as it might be applied on an offshore drilling platform;

FIG. 2 is a schematic diagram of another embodiment of this invention;

FIG. 3 is a schematic diagram of still another embodiment of this invention;

FIG. 4 is a vertical sectional drawing of one embodiment of reactor suitable for use in the process and system of this invention;

FIG. 5 is a vertical sectional view of another embodiment of a reactor suitable for use in the process and system of this invention; and FIG. 6 is an elevational view of one embodiment of separator suitable for use in certain embodiments of this invention, portions of the separator being shown as hidden lines.

DESCRIPTION OF THE PREFERRED EMBODIMENTS

FIG. 1 of the drawing schematically illustrates a portion of an offshore oil well drilling platform having an upper deck 10 and a lower deck 12 on which oil well drilling equipment is mounted. Drilling liquid (normally called drilling mud) is routed through a flow line 14 to a shale shaker 16. Here the cuttings carried by the drilling mud are shaken out and the mud is allowed to drain into the mud tanks 17. Gas which comes out of solution from the mud passes upwardly from the mud tanks and from the shale shaker into a collector housing 18 which is suspended above the shale shaker, and is then carried off through a flow line 20, together with a large proportion of air. Mud from the mud tanks is carried by a pump 22 to a degasser 24 which may, for example, be of the type shown in U.S. Pat. No. 3,616,599 issued Nov. 2, 1971. Gas removed from the mud in the degasser passes through a flow line 26, and the degassed mud is carried to a suitable storage tank (not shown) through the flow line 28.

Flow lines 20 and 26 are provided with check valves 30 and 32 respectively to prevent reverse flow of gas therethrough. The gases which flow through these lines are passed first through a filter separator 34, of a type which is well known in the art, which will filter out entrained moisture and particulate matter.

The dried and cleaned gas from the filter separator 34 may follow one of two paths, a flow line 36 leading through a valve 38 to a reactor 40 or another flow line 42 having a valve 44 therein which bypasses the reactor 40. A valve 46 downstream of the reactor is provided to block off the reactor from the bypass. Another filter separator 48, which may be substantially the same as the filter separator 34, is positioned downstream from the bypass and the reactor 40. Cleaned and filtered gas is taken from the filter separator 48 by a blower 50, which moves the gas into a second reactor 52. The product of the second reactor 52 is emitted to the atmosphere through an exhaust line 54.

A cyclone separator 56 is provided to receive large volumes of gas from a gas "kick" through a flow line 57. In the cyclone separator any mud or other liquids carried by the gas fall out into a trap 59 at the bottom of the separator and are carried through a flow line 58 which is provided with a valve 60. A level control in the trap insures that only liquids pass through line 58. Gas is taken off the separator through a stack 63 where it can be ignited at the upper end by pilot light 64, which may, for example, be a flame front generator such as manufactured by Zink Burner Company, provided with fuel by a small tank of propane, or the like (not shown). The mud is carried through the flow line 58 to the shale shaker where it is treated in the same way as the regular drilling mud.

FIG. 5 shows one form of reactor suitable for use as the reactors 40, 52 in FIG. 1. This reactor comprises an outer tubular shell 62 having a concentric inner tubular sleeve 64 extending out the upper end and to a point near the lower end of the shell 62, defining an annular space between the sleeve and the shell. The exterior end of the sleeve 64 is provided with a flange 66 to which a blind flange 68 is attached. The blind flange 68 supports a pair of electrodes 70 which comprise heater elements extending down into the sleeve to near its lower end. A mounting means 72 is mounted on top of the flange 68 to mount the heating elements and electrical connectors 74 provide electric current to such heating elements.

The tube 64 is provided with an inlet conduit 76 adjacent its upper end and the outer tubular shell 62 is provided with an outlet conduit 78 adjacent its upper end. The outer shell also has an annular screen 80 near its lower end surrounding the tube 64. A catalyst filling opening 82 is adjacent the upper end of the shell 62 and a catalyst emptying opening 84 is adjacent its upper end. The annulus of the reactor is filled to just below outlet 78 with a suitable catalyst which rests on the screen 80, the openings 82 and 84 being closed when catalyst is in the reactor.

A temperature sensing element 83 extends up into the lower end of the tubular member 64, being mounted in the lower end of the shell 62 as at 85.

FIG. 6 illustrates one form of cyclone separator 56 suitable for use in the apparatus disclosed in FIG. 1. This cyclone separator has an upper cylindrical portion 84 and a lower frusto-conical portion 86 extending downwardly and inwardly from the portion 84. An inlet pipe 86 leads tangentially into the cylindrical portion 84. A gas outlet pipe 89 extends out the upper end of the separator and down into the separator to below the lower end of the cylindrical portion 84. An outlet pipe 91 at the lower end of the frusto-conical portion 86 leads into the trap 59 which is provided with a level control (not shown) to maintain the level of liquid above an outlet opening 92.

In a reactor such as that disclosed in FIG. 5, the annular space between the inner tube 64 and the outer shell 62 is filled with a suitable catalyst. In the case of the reactor 40 shown in FIG. 1 this catalyst is preferably a desulfurization catalyst, i.e., one which is effective to cause a reaction of hydrogen sulfide, mercaptans and other sulfur containing compounds to separate out the sulfur and remove it from the gas mixture. A number of desulfurization catalysts are known in the art. The particular catalyst selected will depend upon the operating conditions and other factors. Some of such catalysts are of the regenerative type and operate at atmospheric pressure and ambient temperature. Others are of the absorbent type and operate quite well at elevated temperatures.

In any event, where the process includes a further step of reacting hydrocarbon gases, the catalyst used for this purpose is poisoned by sulfur, so that it is necessary to include an initial catalytic operation to remove sulfur such as may be present in hydrogen sulfide, sulfur dioxide, mercaptans, etc. In the process of this invention a zinc oxide catalyst, such as the Girdler G-72 catalyst furnished by Chemetron Corporation, Catalyst Division, has been found to be most desirable. This catalyst is used in the form of 3/16th inch extrusions having a bulk density of 110 pounds per cubic foot. One cubic foot of zinc oxide will absorb about 8 pounds of sulfur before being spent. Since it is non-regenerable catalyst it must be discarded once it is spent. This catalyst will pick up hydrogen sulfide at room temperature, but it is less efficient in operations below the most desirable temperature range of 500° to 800° F. Substantially higher temperatures are to be avoided, since sulfur vaporization may result.

Alternatively, Girdler G-42 catalyst, a promoted iron oxide catalyst available as ¼ by ¼ inch pellets with a bulk density of 85 pounds per cubic foot, may be used. One cubic foot of this catalyst will absorb 2 pounds of sulfur before requiring regeneration. The iron oxide catalyst may be regenerated using steam or an inert gas at 750° F. Normally this catalyst is operated in the vicinity of 500° F.

A third alternative which is useful under certain circumstances is activated carbon, such as the Girdler G-32 catalyst. One cubic foot of this material will desulfurize 90,000 cubic feet of natural gas. The total amount of carbon required for an installation is dependent upon the cycle period between regenerations. This activated carbon catalyst works well at ambient temperatures and is regenerated by steaming at atmospheric pressure or using inert gas at a temperature of 300° F.

The zinc oxide catalyst is preferred because steam for regeneration is not always available and also the high molecular weight hydrocarbons in the gas streams will usually adversely effect the desulfurization capacity of the other catalysts.

It will be appreciated that the gas which flows through the process of this invention will usually be mostly air, with relatively small proportions of hydrocarbons, and sometimes with small amounts of sulfur-containing compounds, such as hydrogen sulfide. If no sulfur-containing compounds are present, the first reactor in the system shown in FIG. 1 may be bypassed through the line 42. However, if sulfur is present the gas must be desulfurized.

To achieve the highest efficiency with the zinc oxide catalyst the incoming gas stream is preferably routed through a reactor vessel such as that shown in FIG. 5. The gas passes downwardly through the tube 64, being heated by the heater element 70. The temperature control bulb 83 senses the temperature of the gas and suitable control equipment controls the temperature within the desired range. The gas passes out the lower end of the tube 64 and then upwardly through the catalyst in the annulus before passing out of the reactor by the pipe 78. Upon passing through the catalyst at the proper temperature, hydrogen sulfide, for example, is reduced to hydrogen and sulfur, and the sulfur is absorbed in the catalyst. In the process of this invention there will be substantial amounts of oxygen present, and at the operating temperatures it is possible that this oxygen will combine with the released hydrogen to form water vapor. This water vapor will flow out of the reactor with the unreacted methane and other hydrocarbon products, and the remaining air. The resulting products of this reaction are routed through the scrubber-filter 48 and thence to the reactor vessel 52. The scrubber filter serves to knock out free water, if any, and to separate particulate matter. Conventional cooling equipment may also be included, if necessary, to condense the water vapor.

The reactor vessel 52 may be similar in construction to reactor 40, although it may be of a different size and it may be operated at a different temperature. The catalyst used in reactor 52 is one which will cause the reaction of the hydrocarbon gases, such as methane, and any hydrogen emitted from the first reactor, with the oxygen in the air to form carbon dioxide and water vapor. This is an exothermic reaction, so that less heating of the gases may be required then for the previous reaction. If sufficient quantities of the reactants are present, the desired temperatures may be maintained without adding any heat from an external source.

A number of catalysts are known in the art which promote such reactions. Catalysts that are effective include copper, zinc copper chromite, iron chromite and others. However, a platinum promoted catalyst, such as Girdler's G-43, has been found to be most efficient in obtaining the desired results at the lowest cost. This catalyst works best at fairly high temperatures, i.e., 400° F. or more where only hydrogen is to be oxidized, and 800° F. or more for natural gas. The catalyst is effective at 2000° F. or more, so that reactor temperature control is usually not a problem, but temperatures above 2500° F. should be avoided to prevent vaporization of platinum.

It will be appreciated that it is possible to react methane and hydrogen with oxygen even at ambient temperatures, but this requires a pure platinum catalyst, which would make the cost prohibitive. Depending upon the precise conditions present, such as the amount of gas to be reacted and the energy available for heating the gas, where the platinum promoted catalyst is the primary catalyst, it may be possible to load the first one-third to one-fifth of the catalyst bed, where it first contacts the incoming gas, with a palladium catalyst, such as Girdler's G-74. This catalyst is active at lower temperatures but falls off in efficiency as the temperature increases. Since the reaction is exothermic it would not be practical to use palladium alone. Instead, palladium catalyst is used in the first part of the reactor to initiate the reaction and raise the temperature so that the reaction may be continued in the platinum promoted catalyst portion of the bed and brought to completion there.

The reaction in this reactor combines oxygen from the air carried along with the gas with methane and other hydrocarbons to form carbon dioxide and water, and combines oxygen with hydrogen remaining from the desulfurization step to form water vapor. However, if nitrogen oxides are present, which may be the case if any of the gas has been subjected to extremely high temperature air, the catalyst is also effective to cause these oxides to be decomposed to nitrogen and oxygen.

In installations where on site energy generators, such as internal combustion engines, are used, the exhaust gases from such generators may be used as a heat source, thereby eliminating the necessity for heating the gas in an apparatus such as that shown in FIG. 5. At the same time, the exhaust gases are rendered inert by the platinum promoted catalyst. A suitable reactor 152 for such an installation is shown in FIG. 4. This reactor comprises a housing 94 having an inlet 96 and an outlet 98, each of which is adapted for connection in a flow line as by means of the flanges 100, 102. Each of the inlet and outlet pipes is also provided with a thermal well 104 into which a temperature sensing element may be inserted so that the operator can determine the temperature of gases going into the reactor and exiting therefrom, and thereby is enabled to adjust the operations to bring the gases to the desired temperature.

The housing is provided with two transverse perforated plates 106, one of which is spaced away from each end of the housing to form a catalyst chamber 108 therebetween. The center portion 110 of each plate is unperforated, so that gas coming into the inlet is forced to spread throughout the entire cross section of the catalyst chamber. A catalyst fill pipe 112 having a cap 114 on the housing provides a means for filling the catalyst chamber with catalyst.

A pair of segment shaped plates 116 are affixed transversely within the upper portion of the housing, depending into the catalyst chamber, so that gases flowing through the chamber are forced to flow below the plates as indicated by the arrows 118. Thus, if the catalyst settles in the chamber, as indicated, for example, to the level 120, the gases are still forced to flow through the catalyst and cannot bypass the catalyst through the empty upper portion of the catalyst chamber.

FIG. 2 of the drawing illustrates one modification of a system in which a reactor such as that disclosed in FIG. 4 could be used. This system may be substantially identical to that described with reference to FIG. 1 of the drawing, but the reactor 152 may be of the type shown in FIG. 4 in place of the reactor 52 of FIG. 1, which included means for heating gas fed into the reactor. In addition, a flow line 150 is added for the insertion of exhaust gas from an energy source such as a diesel engine or other hydrocarbon fuel energy source which may be present. Due to the high temperature of the exhaust gas, the gas coming from the blower 50 is heated to the temperature necessary to obtain most efficient reaction of the gas in the presence of the catalyst in the reactor 152. At the same time, the exhaust gases are reacted upon passing through the catalyst bed so that these gases also become inert.

FIG. 3 illustrates another embodiment of the invention in which a combination reactor-heat exchanger 154 is substituted for the second reactor 52 of FIG. 1, and a reactor 152 is substituted for the reactor 40 of FIG. 1.

The heat exchanger-reactor 154 comprises a first flow path 156 through which incoming gases to be neutralized are passed, conventional baffling 158 being provided to improve heat exchange efficiency, whereby the incoming gases are heated to the temperature which is found most desirable for suitable reaction in the first desulfurizing reactor 152. The desulfurized gas is then passed through the filter-separator 48 by suction from the blower 50 and the output from the blower 50 is combined with exhaust gases from an internal combustion engine or the like which are fed into the system through a line 150. This addition of exhaust gases raises the temperature of the gas to the temperature found most desirable for reaction in contact with the second catalyst of the system which is found in the annular space 160 of the heat exchanger-reactor 154. Thus, the heated gases passing through this annular space are reacted therein to eliminate undesirable gases, and at the same time they cause heating of the incoming gas to the temperature necessary for the desulfurization process. Also, in the process exhaust gases become inert as in the system previously described with respect to FIG. 2.

It is apparent that the various embodiments of this invention would serve to greatly reduce the danger of destructive explosion and fire around oil and gas drilling rigs and oil and gas production facilities, whether on shore or off shore. In many instances it may be desirable to enclose all equipment and piping from which combustible and toxic gases may escape within a building or other structure, to collect any such gases which may escape and to feed such gases to the apparatus of the present invention. This may be particularly desirable on an offshore production platform where wellhead equipment as well as other equipment may readily be housed within suitable gas collecting structures. Such structures may be formed so as to insure that all toxic and flammable gases and vapors are collected and fed into the gas neutralization equipment of this invention.

Although various embodiments and modifications of the invention have been described herein, the invention is not limited to these, but extends to all forms of the invention which are included within the scope of the appended claims. Furthermore, it is not intended that the process of this invention be considered as being performable only by the specific equipment which is shown and described in the specification, but instead the invention extends to the process described by the claims, regardless of the type of equipment which may be used for its performance.

I claim:

1. Apparatus for collecting and neutralizing potentially harmful gases containing hydrocarbons and sulphur compounds that escape at a highly variable rate during the drilling of oil and gas wells comprising, means for collecting said harmful gases from proximate said wells, said collecting means having an outlet, burner means for accepting a large volume of said gas at an inlet and burning the gas, a catalytic desulphurization reactor having an inlet and an outlet, means for conveying said collected gases from the outlet of said collecting means to the inlet of said desulphurization reactor at normal gas escape rates, means for conveying said collected gases from the outlet of said collecting means to the inlet of said burner means at abnormally high gas escape rates, heater means having an inlet in flow communication with a outlet of said valve means and an outlet in flow communication with the inlet of said desulphurization reactor for heating said gases prior to the gas' entry into the desulphurization reactor, separating means having an inlet in flow communication with the outlet of said heating means and an outlet in flow communication with the inlet of said desulphurization reactor for separating water and particulate matter from said gases prior to their entry into the desulphurization reactor, a catalytic oxidation reactor having an inlet and an outlet, means for conveying said gases from the outlet of said desulphurization reactor to the inlet of said oxidation reactor, and second separating means having an inlet in flow communication with the outlet of said desulphurization reactor, said outlet in flow communication with the inlet of said oxidation reactor for separating water and particulate matter from the gases before they pass through the oxidation reactor.

2. Apparatus as defined by claim 1 and including a hydrocarbon fueled energy converter having an outlet which emits an exhaust containing partially oxidized hydrocarbons, means for conveying said exhaust from said energy converter to the inlet of said oxidation reactor, and mixing means having an inlet in flow communication with the outlet of said converter and an outlet in flow communication with the inlet of said oxidation reactor for mixing the exhaust with said harmful gases before the mixed gases pass through the oxidation reactor.

3. Apparatus as defined by claim 2 and including heat exchange means located upstream of said desulphurization reactor for passing the mixed gases in heat exchange with the harmful gases before said harmful gases are conveyed to the desulphurization reactor.

* * * * *